(12) United States Patent
Hassani et al.

(10) Patent No.: US 12,288,433 B2
(45) Date of Patent: Apr. 29, 2025

(54) ENHANCED BIOMETRIC AUTHORIZATION

(71) Applicant: Ford Global Technologies, LLC, Dearborn, MI (US)

(72) Inventors: Ali Hassani, Ann Arbor, MI (US); Justin Miller, Berkley, MI (US); Medha Karkare, Canton, MI (US); Jake Schwartz, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 17/540,408

(22) Filed: Dec. 2, 2021

(65) Prior Publication Data

US 2023/0177900 A1 Jun. 8, 2023

(51) Int. Cl.
*G07C 9/00* (2020.01)
*B60R 25/01* (2013.01)
*B60R 25/25* (2013.01)

(52) U.S. Cl.
CPC .......... *G07C 9/00563* (2013.01); *B60R 25/01* (2013.01); *B60R 25/25* (2013.01)

(58) Field of Classification Search
None
See application file for complete search history.

(56) References Cited

U.S. PATENT DOCUMENTS

| | | | |
|---|---|---|---|
| 6,100,811 A | 8/2000 | Hsu et al. | |
| 8,296,573 B2 | 10/2012 | Bolle et al. | |
| 9,071,602 B2 | 6/2015 | Kamakura | |
| 9,239,945 B2 | 1/2016 | Hama | |
| 9,461,992 B2 | 10/2016 | Outwater et al. | |
| 9,576,121 B2 | 2/2017 | Cao | |
| 9,688,225 B2 | 6/2017 | Byrne et al. | |
| 10,164,973 B1 | 12/2018 | Prasad et al. | |
| 10,248,771 B1 | 4/2019 | Ziraknejad et al. | |
| 10,414,377 B2 | 9/2019 | Hoyos et al. | |

(Continued)

FOREIGN PATENT DOCUMENTS

WO 2021094774 A1 5/2021

OTHER PUBLICATIONS

Non-Final Office Action for U.S. Appl. No. 17/540,321, filed Dec. 2, 2021, as issued by the USPTO Dec. 13, 2023.

(Continued)

*Primary Examiner* — Christian Chace
*Assistant Examiner* — Shayne M. Gilbertson
(74) *Attorney, Agent, or Firm* — Frank Lollo; Brooks Kushman P.C.

(57) ABSTRACT

Upon obtaining biometric data for a user of a structure while the user is outside the structure, user data for the user is updated based on a confidence score for the biometric data exceeding a first confidence threshold. Based on the confidence score for the biometric data not exceeding the first confidence threshold, instructions are provided to the user to provide updated biometric data. Then the user data is updated based on a confidence score for the updated biometric data exceeding a second confidence threshold. The second confidence threshold is greater than the first confidence threshold. Structure components are controlled based on the updated user data.

19 Claims, 5 Drawing Sheets

(56) References Cited

U.S. PATENT DOCUMENTS

| | | | |
|---|---|---|---|
| 10,464,530 | B2 | 11/2019 | Falkson et al. |
| 10,742,410 | B2 | 8/2020 | Gehrmann et al. |
| 10,902,237 | B1 | 1/2021 | Aggarwal et al. |
| 10,970,516 | B2 | 4/2021 | Schwartz et al. |
| 11,017,203 | B1* | 5/2021 | Aggarwal ............ G06V 40/1365 |
| 12,100,252 | B2* | 9/2024 | Tamura ................. G06V 40/40 |
| 2006/0294393 | A1 | 12/2006 | McCall |
| 2007/0124599 | A1* | 5/2007 | Morita ................. B60R 25/255 |
| | | | 726/19 |
| 2008/0059805 | A1 | 3/2008 | Yoshioka et al. |
| 2015/0286811 | A1 | 10/2015 | Phan et al. |
| 2016/0065666 | A1 | 3/2016 | Kim et al. |
| 2017/0063850 | A1 | 3/2017 | Cartaya |
| 2017/0132408 | A1 | 5/2017 | Kim et al. |
| 2018/0272945 | A1* | 9/2018 | Worthen ............... G01J 1/4228 |
| 2018/0365402 | A1 | 12/2018 | Ko et al. |
| 2019/0005217 | A1 | 1/2019 | Kim et al. |
| 2019/0362333 | A1 | 11/2019 | Agarwal |
| 2020/0082062 | A1 | 3/2020 | Mequanint et al. |
| 2020/0311509 | A1 | 10/2020 | Benkley, III et al. |
| 2020/0320181 | A1 | 10/2020 | Deutschmann et al. |
| 2021/0016731 | A1* | 1/2021 | Onyekwelu ........... B60R 16/037 |
| 2021/0053530 | A1* | 2/2021 | Bohl ..................... B60R 25/102 |
| 2021/0182373 | A1 | 6/2021 | Tussy |
| 2021/0229673 | A1 | 7/2021 | Singh et al. |
| 2021/0309181 | A1* | 10/2021 | Kale ..................... G06V 40/172 |
| 2022/0019646 | A1* | 1/2022 | Bielby .................. G06V 10/82 |
| 2022/0108701 | A1 | 4/2022 | Gupya et al. |
| 2022/0219643 | A1 | 7/2022 | Hanson et al. |
| 2022/0245564 | A1 | 8/2022 | Castinado et al. |
| 2022/0253514 | A1 | 8/2022 | Ackerman et al. |
| 2022/0300593 | A1 | 9/2022 | Brownlee |
| 2023/0145344 | A1* | 5/2023 | Okuyama ............ G06V 40/172 |
| | | | 726/18 |
| 2023/0162695 | A1* | 5/2023 | Chau ....................... G02F 1/172 |
| | | | 345/207 |
| 2024/0273951 | A1* | 8/2024 | Kajiyama .............. B60K 35/22 |

OTHER PUBLICATIONS

Non-Final Office Action for U.S. Appl. No. 17/540,394, filed Dec. 2, 2021, as issued by the USPTO on Jul. 14, 2023.

Non-Final Office Action for U.S. Appl. No. 17/540,432, filed Dec. 2, 2021, as issued by the USPTO Nov. 24, 2023.

Final Office Action for U.S. Appl. No. 17/540,432, filed Dec. 2, 2021, as issued by the USPTO Mar. 14, 2024.

Notice of Allowance for U.S. Appl. No. 17/540,321, filed Dec. 2, 2021, as issued by the USPTO May 15, 2024.

* cited by examiner

ENHANCED BIOMETRIC AUTHORIZATION

BACKGROUND

A computer performing biometric authorization can receive sensor data to determine an identity of a person seeking authorization for access to be granted by the computer. Biometric authorization can include, for example, facial recognition, a type of biometric authorization where an image of a human face is used to identify a person. Biometric authorization can rely upon acquiring accurate biometric data.

DETAILED DESCRIPTION

Figure 1:
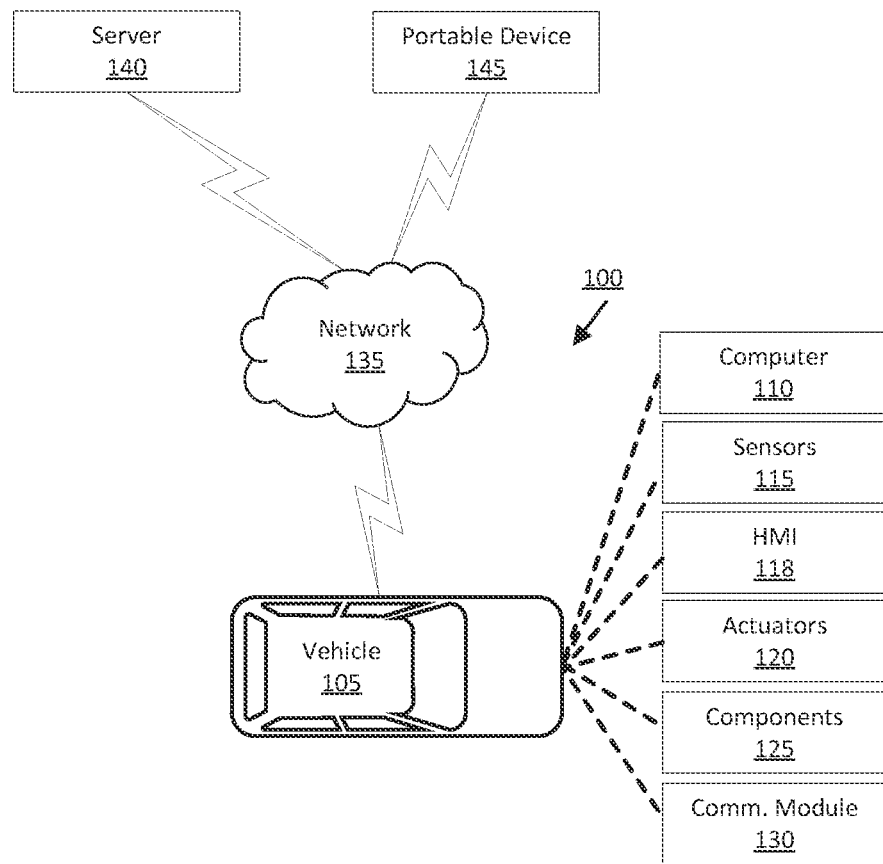
FIG. 1 is a block diagram illustrating an example control system for a vehicle.

Biometric authorization can be used by a computer to control access to devices, objects, and/or applications, e.g., to vehicles, buildings, computers, cell phones, other devices, etc. For example, biometric authorization can be implemented to permit authorized people to access, e.g., to a vehicle or building, and to deny access to unauthorized people. Biometric authorization may require that a user provide one or more types of biometric data and/or to provide the biometric data in a specific manner, e.g., in a specified sequence, to a specified sensor, etc., to generate user data that can be used to determine authorization. Biometric data is data representing measurements of physiological characteristics. A type of biometric data is data representing a specific physiological characteristic, e.g., distances between ridges in a fingerprint, distances between facial features, etc. Biometric authorization can authorize users by comparing the biometric data provided by the user to biometric data subsequently obtained via sensors in the vehicle, building, computing device, etc.

The results of performing the biometric authorization can be downloaded to a device granting or denying authorization and permission to access a structure, for example, a vehicle, a building, a room, etc. Successful authorization can be used for security applications such as access to a location, e.g., a passenger cabin of a vehicle, a room, a building, etc., by unlocking a door. In other examples, successful authorization can be used to enable vehicle or building controls, or yet further alternatively or additionally access to a device such as a computer by enabling input devices like a keyboard or mouse, or granting access to computer files.

Authorizing users for vehicles will be described herein as a non-limiting example of biometric authorization. That is, a vehicle will be described herein as a non-limiting example of a structure. It is to be understood that other types of structure, e.g., a building, may utilize the techniques described herein for biometric authorization.

Vehicles can be equipped with computing devices, networks, sensors, and controllers to acquire and/or process data regarding the environment and to permit access to the vehicle based on the data. For example, a camera in a vehicle can be programmed to acquire an image of an approaching user and, upon determining the identity of the user based on biometric authorization, e.g., via facial recognition software, unlock a door to permit the user to enter a passenger cabin of the vehicle. Likewise, cameras included in the passenger cabin of the vehicle can acquire one or more images of a user and, upon determining the identity of the user based on biometric authorization, e.g., via facial recognition software, accept commands from the user to operate the vehicle.

Due to packaging constraints, interior sensors and exterior sensors may have different parameters (e.g., physical characteristics such as resolution, sensing media, size, shape, etc.) and/or capabilities, which may increase a likelihood of an authorized user failing biometric authorization and/or an unauthorized user passing biometric authorization. For example, interior sensors may have a different shape of lens than exterior sensors, which results in the fields of view of the respective sensors being different. As another example, interior sensors may acquire color image data and the exterior sensors may acquire infrared image data. Additionally, environmental conditions inside the passenger cabin may vary from environmental conditions outside the passenger cabin, which can also increase a likelihood of an authorized user failing biometric authorization and/or an unauthorized user passing biometric authorization.

Advantageously, during biometric enrollment (as discussed below), the vehicle computer can provide instructions for a user to provide biometric data while outside the vehicle. The vehicle computer can then biometrically authorize the user based on a confidence score for the biometric data exceeding a first confidence threshold. If the vehicle computer determines not to authorize the user, then the vehicle computer can provide instructions for the user to provide updated biometric data while outside the vehicle. The vehicle computer can then biometrically authorize the user based on a confidence score for the updated biometric data exceeding a second confidence threshold. Authorizing the user based on the first confidence threshold allows the vehicle computer to biometrically authorize the user while accounting for the different features between the sensors and the environmental conditions around the sensors, which can reduce the likelihood of an authorized user failing biometric authorization and being denied access to the vehicle. Additionally, authorizing the user based on the second confidence threshold after the user was not authorized based on the first confidence threshold allows the vehicle computer to reduce a likelihood of an unauthorized user passing biometric authorization and gaining access to the vehicle.

A system includes a computer including a processor and a memory, the memory storing instructions executable by the processor to, upon obtaining biometric data for a user of a structure, update user data for the user based on a confidence score for the biometric data exceeding a first confidence threshold. The user is outside of the structure. The instructions further include instructions to, based on the confidence score for the biometric data not exceeding the first confidence threshold, provide instructions to the user to provide updated biometric data. The instructions further include instructions to then update the user data based on a confidence score for the updated biometric data exceeding a second confidence threshold. The second confidence threshold is greater than the first confidence threshold. The instructions further include instructions to control structure components based on the updated user data.

The instructions can further include instructions to generate the user data based on obtaining enrollment biometric data for the user inside the structure.

The instructions can further include instructions to, upon generating the user data, provide instructions, via at least one of the structure components or a remote computer, to the user to provide the biometric data.

The instructions can further include instructions to, upon detecting the user inside the structure, provide instructions, via the structure components, to the user to provide the enrollment biometric data.

The instructions can further include instructions to, prior to obtaining the biometric data, actuate the structure components based on determining a difference between a light parameter at an exterior sensor and a light parameter at an interior sensor. The interior sensor is positioned inside the structure and the exterior sensor is positioned outside of the structure. The structure component may be at least one of a lighting component or a window.

The instructions can further include instructions to, after updating the user data with one of the biometric data or the updated biometric data, obtain challenge biometric data for the user while the user is outside the structure. The instructions can further include instructions to authorize the user based on a confidence score for the challenge biometric data exceeding the first confidence threshold.

The instructions can further include instructions to, upon determining to not authorize the user, prevent the user from accessing the structure.

The instructions can further include instructions to, upon authorizing the user, permit the user to access the structure.

The instructions can further include instructions to obtain the challenge biometric data based on one of receiving a user input or detecting an authorized portable device within a predetermined distance of the structure.

The instructions can further include instructions to, upon authorizing the user, obtain secondary challenge biometric data for the user while the user is inside the structure. The instructions can further include instructions to verify the user based on a confidence score for the secondary challenge biometric data exceeding the second confidence threshold.

The instructions can further include instructions to, upon verifying the user, permit the user to operate controls for the structure based on the updated user data.

The instructions can further include instructions to, upon determining not to verify the user, prevent the user from operating controls for the structure.

The instructions can further include instructions to provide instructions, via at least one of the structure components or a remote computer, to the user to provide the updated biometric data.

The instructions can further include instructions to update the user data based additionally on receiving a user input.

The instructions can further include instructions to update the user data based additionally on detecting an authorized portable device within a predetermined distance of the structure.

A method includes, upon obtaining biometric data for a user of a structure, updating user data for the user based on a confidence score for the biometric data exceeding a first confidence threshold. The user is outside of the structure. The method further includes, based on the confidence score for the biometric data not exceeding the first confidence threshold, providing instructions to the user to provide updated biometric data. The method further includes then updating the user data based on a confidence score for the updated biometric data exceeding a second confidence threshold. The second confidence threshold is greater than the first confidence threshold. The method further includes controlling structure components based on the updated user data.

The method can further include, prior to obtaining the biometric data, actuating the structure components based on determining a difference between light parameter at an exterior sensor and light parameter at an interior sensor. The interior sensor is positioned inside the structure and the exterior sensor is positioned outside of the structure.

The method can further include, after updating the user data with one of the biometric data or the updated biometric data, obtaining challenge biometric data for the user while the user is outside the structure. The method can further include authorizing the user based on a confidence score for the challenge biometric data exceeding the first confidence threshold.

The method can further include upon authorizing the user, obtaining secondary challenge biometric data for the user while the user is inside the structure. The method can further include verifying the user based on a confidence score for the secondary challenge biometric data exceeding the second confidence threshold.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-4, an example control system 100 includes a vehicle 105. A vehicle computer 110 in the vehicle 105 receives data from sensors 115. The vehicle computer 110 is programmed to, upon obtaining biometric data for a user of a vehicle while the user is outside the vehicle, update user data for the user based on a confidence score for the biometric data exceeding a first confidence threshold. The vehicle computer 110 is further programmed to, based on the confidence score for the biometric data not exceeding the first confidence threshold, provide instructions to the user to provide updated biometric data. The vehicle computer 110 is further programmed to then update the user data based on a confidence score for the updated biometric data exceeding a second confidence threshold. The second confidence threshold is greater than the first confidence threshold. The vehicle computer 110 is further programmed to control vehicle components 125 based on the updated user data.

Turning now to FIG. 1, the vehicle 105 includes the vehicle computer 110, sensors 115, actuators 120 to actuate various vehicle components 125, and a vehicle 105 communication module 130. The communication module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor 115(s), etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. As another example, the vehicle 105 can include one or more sensors 115, e.g., camera sensors 115, mounted inside a cabin of the vehicle 105 and oriented to capture images of users in the vehicle 105 cabin. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115, e.g., substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 105, a sign, a tree, etc., relative to the vehicle 105. As one example, the data may be image data of the environment around the vehicle 105. In such an example, the image data may include one or more objects and/or markings, e.g., lane markings, on or along a road. As another example, the data may be image data of the vehicle 105 cabin, e.g., including users and seats in the vehicle 105 cabin Image data herein means digital image data, i.e., comprising pixels, typically with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect a user input and provide user input data to the vehicle computer 110. That is, the vehicle computer 110 may be programmed to receive user input from the HMI 118. The user may provide the user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

In addition, the vehicle computer 110 may be configured for communicating via a vehicle-to-vehicle communication module or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a remote server computer 140 (typically via direct radio frequency communications). The communication module could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, Ultra-Wideband (UWB), Near Field Communication (NFC), dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or some other wide area network.

The portable device 145 can be a conventional computing device, i.e., including one or more processors and one or more memories, programmed to provide operations such as disclosed herein. The portable device 145 can be any one of a variety of computers that can be used while carried by a person, e.g., a smartphone, a tablet, a personal digital assistant, a smart watch, etc. Further, the portable device 145 can be accessed via the network 135, e.g., the Internet, a cellular network, and/or or some other wide area network.

Figure 2:
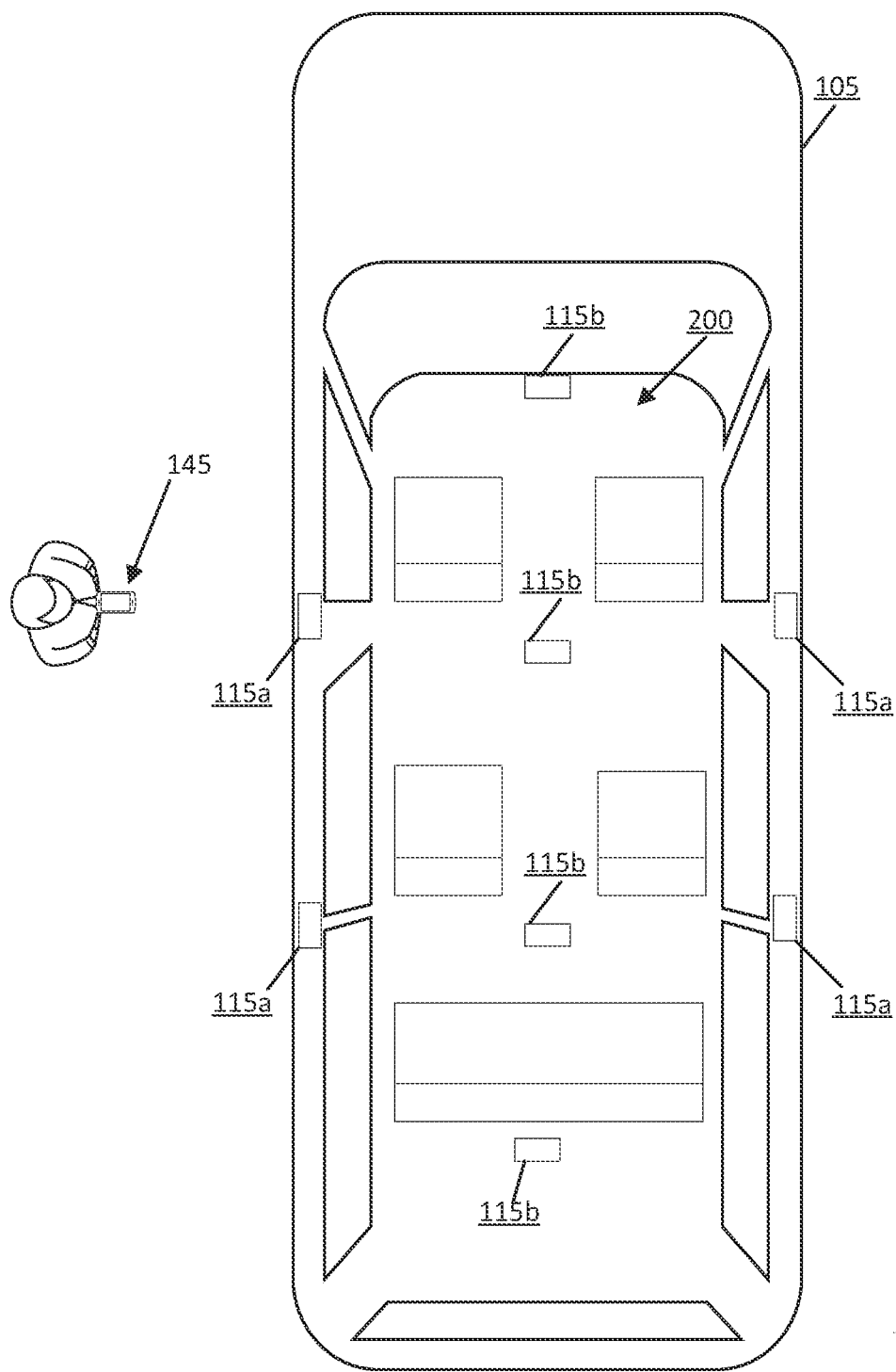
FIG. 2 is a diagram illustrating an exemplary passenger cabin of the vehicle.

FIG. 2 is a diagram of a top view of an example passenger cabin 200 of an example vehicle 105. The vehicle 105 may include a body (not numbered) defining the passenger cabin 200 to house occupants, if any, of the vehicle. The body includes doors and windows that can be opened, e.g., to allow ingress and egress from the passenger cabin 200.

The passenger cabin 200 may extend across the vehicle 105, i.e., from one side to the other side of the vehicle 105. The passenger cabin 200 includes a front end (not numbered) and a rear end (not numbered) with the front end being in front of the rear end during forward movement of the vehicle 105. The passenger cabin 200 includes one or more seats (not numbered). The seats may be arranged in any suitable arrangement. For example, the passenger cabin 200 may include one or more front seats disposed at a front of the passenger cabin 200 and one or more back seats disposed behind the front seats. The passenger cabin 200 may also include third-row seats at the rear of the passenger cabin 200. In FIG. 2, the front seats and back seats are shown to be bucket seats and the third-row seats are shown to be bench seats, but the seats may be other types.

The vehicle 105 may include any suitable number of sensors 115, e.g., one or more. For example, as illustrated in FIG. 2, the vehicle 105 may include a plurality of external sensors 115a that are positioned to monitor an environment around the vehicle 105, and a plurality of internal sensors 115b that are positioned to monitor the passenger cabin 200 of the vehicle 105.

Figure 3:
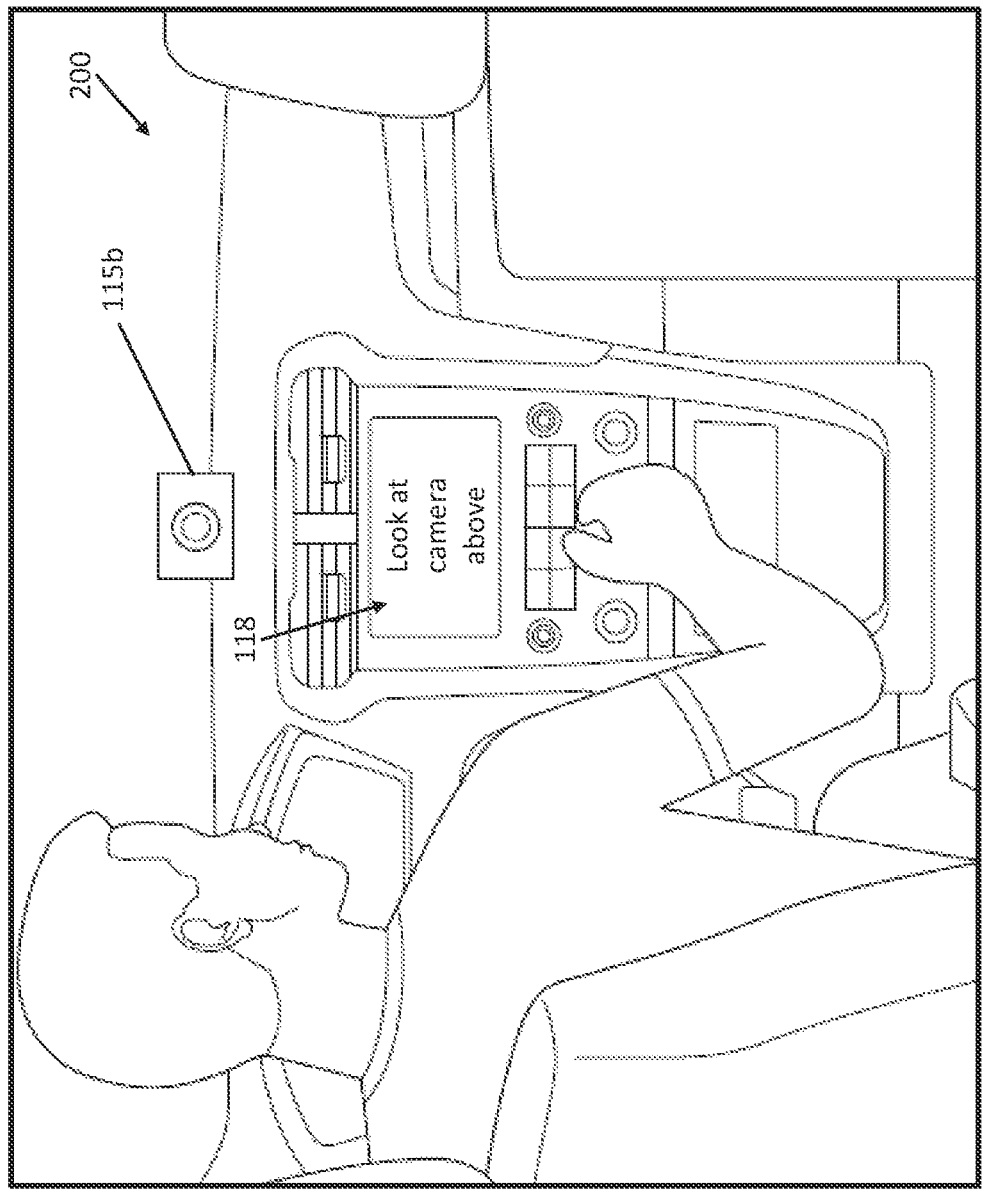
FIG. 3 is a diagram illustrating a user in the exemplary passenger cabin of the vehicle.
Figure 4:
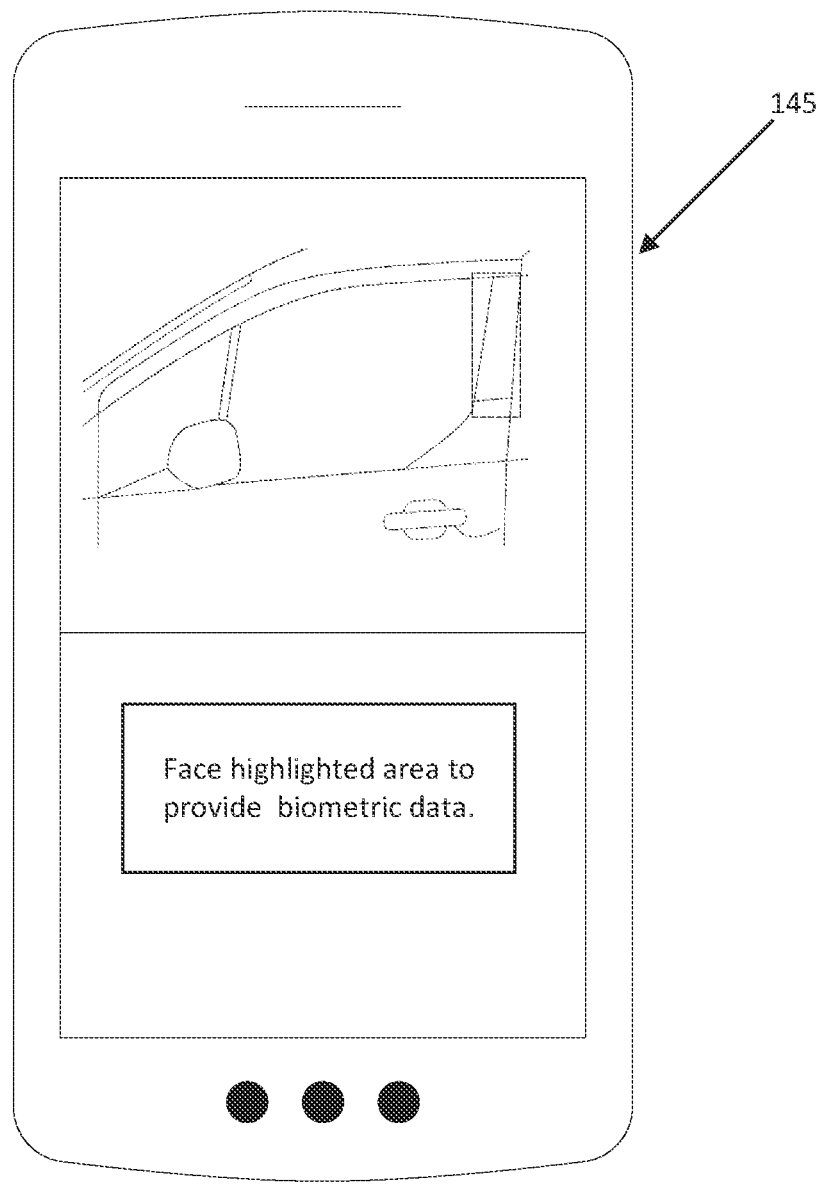
FIG. 4 is a diagram illustrating an exemplary portable device.

The vehicle computer 110 is programmed to determine a user is in the passenger cabin 200 (see FIG. 3). The vehicle computer 110 can, for example, detect the user in the passenger cabin 200 based on data from the internal sensor(s) 115b. For example, the vehicle computer 110 can monitor data from the internal sensor 115b to detect a user has moved into the field of view of the internal sensor 115b. As another example, the vehicle computer 110 can detect the user in the passenger cabin 200 based on receiving a user input via the HMI 118. For example, the vehicle computer 110 can actuate the HMI 118 to display a virtual button that the user can select to indicate that the user is in the passenger cabin 200. In other words, the HMI 118 may activate sensors that can detect the user selecting the virtual button to indicate that the user is in the passenger cabin 200. Upon detecting the user input, the HMI 118 can provide the user input to the vehicle computer 110, and the vehicle computer 110 can determine that the user is in the passenger cabin 200 based on the user input.

As yet another example, the vehicle computer 110 can determine the user is in the passenger cabin 200 based on detecting, in the passenger cabin 200, a portable device 145 associated with the user. For example, the vehicle computer 110 may be programmed to transmit, e.g., via a short-range broadcast protocol, a radio frequency (RF) signal, e.g., BLE, Ultra-Wideband (UWB), etc. The vehicle computer 110 can then detect the portable device 145 based on detecting either the return of the respective transmitted RF signal or a response RF signal transmitted from the portable device 145, e.g., continuously or in response to detecting the RF signal transmitted by the vehicle computer 110. Upon detecting the portable device 145 the vehicle computer 110 can determine a location of the portable device 145 based on data from the portable device 145. The portable device 145 can transmit, e.g., via the network 135, location data, e.g., geo-coordinates, of the portable device 145 to the vehicle computer 110. Upon receiving the location data of the portable device 145, the vehicle computer 110 can use the location data to establish a GPS-based geo-fence. A geo-fence herein has the conventional meaning of a boundary for an area defined by sets of geo-coordinates. In such an example, the geo-fence specifies a perimeter of the passenger cabin 200. The vehicle computer 110 can then determine that the user is within the passenger cabin 200 based on the location data of the portable device 145 indicating the portable device 145 is within the geo-fence.

Upon determining that the user is in the passenger cabin 200, the vehicle computer 110 can authenticate the user based on detecting an authenticator. Authenticating the user means validating or proving the identity of the user; a failure to authenticate occurs upon a determination that the user's identity cannot be validated, i.e., proved.

The authenticator may, for example, be an authorized portable device 145. In such an example, upon detecting the portable device 145, the vehicle computer 110 can authorize the portable device 145, e.g., to prevent an unauthorized user from accessing and/or operating the vehicle 105. Authorizing the portable device 145 means the vehicle computer 110 determining that the portable device 145 has permission to communicate with the vehicle computer 110; a failure to authorize occurs upon a determination that the portable device 145 lacks permission to communicate with the vehicle computer 110.

The vehicle computer 110 may be programmed to authorize the portable device 145 based on a key, e.g., a combination of numbers and/or characters, received from the portable device 145. For example, the vehicle computer 110 may authorize the portable device 145 based on determining the received key matches an expected key, e.g., known to certain parties such as vehicle 105 distributors, e.g., dealers, stored in the memory of the vehicle computer 110. As another example, the authorized portable device 145 can have an RFID tag or the like uniquely specifying the user from among other potential users who regularly use the vehicle 105. The RFID signal can be associated with the user in memory. As another example, the authorized portable device 145 can pair with, e.g., the HMI 118. The authorized portable device 145 can be associated with the user in memory.

As another example, the authenticator may be a user input specifying identifying information for the user, e.g., a username and a password. For example, the vehicle computer 110 can actuate the HMI 118 to display virtual buttons corresponding to alphanumeric characters that the user can select to provide the identifying information. In other words, the HMI 118 may activate sensors that can detect the user selecting virtual buttons to specify the user's identifying information. Upon detecting the user input, the HMI 118 can provide the user input to the vehicle computer 110, and the vehicle computer 110 can authenticate the user based on the user input. For example, the vehicle computer 110 can compare the identifying information specified by the user input to identifying information stored, e.g., in a memory of the vehicle computer 110. If the retrieved identifying information matches the stored identifying information, then the vehicle computer 110 determines to authenticate the user. In this context, "match" means retrieved identifying information identifies a same user as stored identifying information. If the retrieved identifying information does not match the stored identifying information, then the vehicle computer 110 determines to not authenticate the user.

Upon determining to not authenticate the user, the vehicle computer 110 can control vehicle components 125 to prevent operation of the vehicle 105. Additionally, the vehicle computer 110 can control vehicle components 125, e.g., disabling virtual buttons on the HMI 118, to prevent the user from accessing and/or updating user data stored in the memory of the vehicle computer 110.

Upon authenticating the user, the vehicle computer 110 can be programmed to determine a light parameter at an internal sensor 115$b$ and a light parameter at an external sensor 115$a$. Herein, a "light parameter" means a measurement of a physical phenomenon of light captured by a sensor 115. For example, the vehicle computer 110 can obtain image data from an internal sensor 115$b$ and then, e.g., according to known image processing techniques, determine a light parameter at the internal sensor 115$b$ based on the image data. Additionally, the vehicle computer 110 can obtain images from an external sensor 115$a$ and then, e.g., according to known image processing techniques, determine a light parameter at the external sensor 115$a$. The vehicle computer 110 can determine a difference between the light parameters, e.g., by subtracting numerical values representing the respective light parameters. Non-limiting examples of light parameters include intensity (e.g., measured in candelas), contrast, brightness (e.g., measured in candelas per meter squared), etc.

Upon determining the difference, the vehicle computer 110 can compare the difference to a light threshold. The light threshold may be stored, e.g., in a memory of the vehicle computer 110. The light threshold specifies a minimum difference between the light parameters above which the vehicle computer 110 can actuate vehicle components 125 to compensate for the difference. The light threshold may be determined empirically, e.g., based on testing that allows for determining a difference between respective light parameters at internal and external vehicle sensors 115 that affects the accuracy of biometric authorization. If the difference is less than the light threshold, then the vehicle computer 110 can ignore the difference.

If the difference is greater than the light threshold, then the vehicle computer 110 can actuate one or more vehicle components 125 to compensate for the difference. That is, the vehicle computer 110 can actuate the vehicle component(s) 125 to reduce the difference to at least the light threshold. For example, the vehicle computer 110 can actuate vehicle 105 windows to open, which can allow light from the environment around the vehicle 105 to enter the passenger cabin 200 and thereby reduce the difference. As another example, the vehicle computer 110 can actuate vehicle 105 lighting components inside and/or outside of the passenger cabin 200 to control the light parameters at the respective sensors 115, e.g., such that the light parameters are substantially the same. Upon actuating the vehicle component(s) 125, the vehicle computer 110 can determine an updated difference between light parameters at the internal and external sensors 115$b$, 115$a$, e.g., as discussed immediately above.

The vehicle computer 110 can query the memory to select the user data associated with the authenticated user. For example, the vehicle computer 110 can maintain a look-up table or the like, e.g., stored in the memory of the vehicle computer 110, that associates the authenticated user with the corresponding biometric data. Upon determining to initiate biometric enrollment (as discussed below), the vehicle computer 110 can update the look-up table to associate the identified user with the first biometric data. The vehicle computer 110 can control vehicle 105 operation based on the user data for the authenticated user.

The vehicle computer 110 can store, e.g., in a memory, user data for each of a plurality of potential users. The user data can keep track of authorized users, i.e., users that have permission to access the vehicle 105, and the user data can update over time as biometric data for the user changes, e.g., due to weight gain or loss, age, hair growth or loss, etc. User data includes biometric data for the respective user and a user authorization for the respective user. A user authorization, as used herein, specifies one or more vehicle 105 features that a user has permission to access and/or one or more operating parameters that a user has permission to control.

In the context of this document a "vehicle feature" is a setting of a vehicle component 125 that can be selected by user input, e.g., via the HMI 118. Non-limiting examples of vehicle 105 features include heating and/or cooling seats, climate control, e.g., in multiple zones or areas of the passenger cabin 200, heating a steering wheel, auto-dimming a rearview mirror, heating side mirrors, multi-color lighting, controlling a radio, controlling a moonroof, etc.

In the context of this document an "operating parameter" is an actual value of a measurement of a physical characteristic of a vehicle 105 or an environment around that vehicle 105 during vehicle operation. A variety of operating parameters may be determined during vehicle 105 operation. A non-limiting list of operating parameters includes a speed of the vehicle 105, a following distance between vehicles, a stopping location, an acceleration rate of the vehicle 105, a vehicle 105 destination, a vehicle 105 route, etc.

In an example in which the structure is a building, the user authorization may specify the building, or a room therein, that a user is permitted or prevented from entering. Additionally, or alternatively, the user authorization may specify one or more controls for the building that the user is permitted or prevented from controlling, e.g., light controls, heating controls, cooling controls, speaker controls, etc.

When no user data is associated with the authenticated user, the vehicle computer 110 can be programmed to initiate biometric enrollment for the authenticated user based on receiving a user input. For example, the vehicle computer 110 can actuate the HMI 118 to display a virtual button that the user can select to initiate biometric enrollment. That is, the HMI 118 can actuate sensors that can detect the user selecting the virtual button. Upon detecting the user input, the HMI 118 can provide the user input to the vehicle computer 110 can the vehicle computer 110 can initiate biometric enrollment. The vehicle computer 110 can provide initial instructions to the user to provide the enrollment biometric data. For example, the vehicle computer 110 can actuate the HMI 118 to output the initial instructions (see FIG. 3). The initial instructions specify actions for the user to perform, e.g., to interact with, such as face and/or touch, a specified sensor, to adjust a user pose relative to a specified sensor, to remove accessories, such as hats, glasses, etc., to speak a word or phrase, etc., to allow the vehicle computer 110 to obtain the enrollment biometric data for the user. Biometric enrollment in this document means to generating user data based on obtaining initial, i.e., baseline, biometric data for a given user. That is, biometric data obtained prior to the generation of user data for a user may be referred to as enrollment biometric data.

When user data is associated with the authenticated user, the vehicle computer 110 is programmed to biometrically authorize the user based on challenge biometric data, as discussed below. Challenge biometric data herein means biometric data obtained from a user in real-time or near real-time to compare to stored biometric data to perform biometric authorization for the user. Challenge biometric data is obtained after the generation of the user data for the user.

During biometric enrollment, the vehicle computer 110 can actuate one or more sensors 115 to obtain biometric data for the authenticated user. For example, the vehicle computer 110 can actuate sensors 115 positioned to face the user. The vehicle computer 110 can actuate various sensors 115 to obtain corresponding types of biometric data. For example, the vehicle computer 110 can actuate an image sensor 115 to obtain image data including facial characteristics of the user. Additionally, or alternatively, the vehicle computer 110 can actuate a capacitive touch sensor 115 to obtain data including a fingerprint of the user. The vehicle computer 110 can, for example, validate the biometric data by employing known watermarking techniques that encrypt data strings that indicate validity of the biometric data and include the encrypted data strings in the biometric data.

Upon obtaining the enrollment biometric data, the vehicle computer 110 generates user data for the authenticated user. For example, the vehicle computer 110 can maintain a look-up table, e.g., stored in the memory of the vehicle computer 110, that associates the authenticated user with the corresponding biometric data. Upon determining to initiate biometric enrollment, the vehicle computer 110 can update the look-up table to associate the authenticated user with the enrollment biometric data.

Additionally, the vehicle computer 110 can actuate the HMI 118 to display virtual buttons corresponding to various vehicle 105 features and various operating parameters that the user can select to specify the user authorization. In other words, the HMI 118 may activate sensors that detect the user selecting the virtual button(s) to specify the user authorization. Upon detecting the user input, the HMI 118 can provide the user input to the vehicle computer 110, and the vehicle computer 110 can determine the user authorization based on the user input. The vehicle computer 110 can then update the user data to include the determined user authorization. That is, the user data can associate the user authorization with the corresponding user.

Additionally, the vehicle computer 110 is programmed to update the user data to include secondary enrollment biometric data for the user. Secondary enrollment biometric data herein means biometric that is obtained during biometric enrollment and while the user is outside the vehicle 105. The vehicle computer 110 can obtain the secondary enrollment biometric data in substantially the same manner as discussed above regarding obtaining the enrollment biometric data.

The vehicle computer 110 can provide instructions to the user to provide the secondary enrollment biometric data while outside the vehicle 105. For example, the vehicle computer 110 can instruct the HMI 118 to actuate one or more output devices, such as a display, a speaker, etc., to output the instructions to the user. In an example in which the vehicle 105 lacks an HMI 118 facing or available to the environment outside the vehicle 105, the vehicle computer 110 can actuate vehicle 105 windows to open such that the user can receive the instructions from an HMI 118 in the passenger cabin 200 while the user is outside the vehicle 105. As another example, the vehicle computer 110 may provide the instructions to the authorized portable device 145 (see FIG. 4). For example, the vehicle computer 110 may transmit the instructions to the authorized portable device 145, e.g., via the network 135. In such an example, the authorized portable device 145 can provide the instructions to the user, e.g., by actuating one or more output devices, such as a display and/or speaker.

The instructions specify actions for the user to perform to allow the vehicle computer 110 to obtain the secondary enrollment biometric data for the user. For example, the instructions may instruct the user to exit the passenger cabin 200 and interact with specified external sensors 115a to provide the secondary enrollment biometric data.

The vehicle computer 110 is programmed to biometrically authorize the authenticated user based on the secondary enrollment biometric data. That is, the vehicle computer 110 can perform biometric authorization using the secondary enrollment biometric data and the user data. Authorizing the authenticated user means determining that the authenticated user has permission to access the vehicle 105; a failure to authorize occurs upon a determination that the authenticated user lacks permission to access the vehicle 105.

Biometric facial recognition is described herein as one non-limiting example of biometric authorization. Biometric facial recognition typically operates by calculating physiological characteristics of a human face and comparing the calculated physiological characteristics to stored physiological characteristics from the trained model. Physiological characteristics can include measures of facial features such as the distance between pupils, distance between corners of the mouth and length of nose, etc. These measures can be normalized by forming ratios of the measurements and stored as the trained model. At challenge time, an image of the human seeking access is acquired and processed to extract physiological characteristics which are then compared to stored physiological characteristics to determine a match. Other non-limiting examples of biometric authorization can include fingerprint recognition, eye recognition, voice recognition, etc.

Biometric authorization software can be executed on the vehicle computer 110 or the sensor 115 data, e.g., image data, can be uploaded to a remote server computer 140 that maintains a database of trained models for execution. An example of biometric authorization software is facial identification software, for example Face Tracker. Face Tracker is a facial recognition software library written in C++ and available on facetracker.net under the MIT software license.

Facial identification software can determine two sets of facial features corresponding to a challenge image and an enrollment image and determine ratios of distances between features. Facial identification software can determine a confidence score by determining a match value with previously determined facial identification features. A user status can be determined by comparing the confidence score to a first confidence threshold. The first confidence threshold can be determined empirically, e.g., based on testing that allows for determining a threshold that minimizes a number of incorrectly authorized users.

Facial features include locations on a facial image such as inner and outer corners of the eyes and corners of the mouth. For example, facial feature detection routines such as SURF in the Dlib image processing library can determine locations on a face corresponding to facial features such as the center of each eye and the center of a mouth. The facial identification software can compare the ratios based on the two sets of features and determine a match value. If the ratios between sets of features match, meaning that they have the same value within an empirically determined tolerance, the person in the challenge image is determined to be the same person as in the previously acquired enrollment image.

The match value can be determined by determining a mean squared difference between the two sets of ratios. Matching the ratios of distances can reduce the variance in facial feature measurements caused by differences due to differences in distances from the camera and differences in poses between the two images.

The confidence score can be determined by multiplying the match value by a scalar constant that maps the match value to the interval (0,1), with values close to 1 corresponding to a good match and values close to 0 corresponding to a poor match. The scalar constant can be determined empirically by acquiring and testing a plurality of enrollment and challenge images.

A confidence score greater than, i.e., exceeding, the first confidence threshold can indicate that the secondary enrollment biometric data is a good match for the enrollment biometric data, therefore the user status should be "authorized." A confidence score less than or equal to the first confidence threshold can indicate that the secondary enrollment biometric data did not match the enrollment biometric data, and therefore user status should be set to "not authorized." A confidence score less than or equal to the first confidence threshold can indicate problems with the secondary enrollment biometric data, e.g., an unauthorized user passed facial identification, or an authorized user failed facial identification.

Upon determining that the user is authorized, the vehicle computer 110 can control the vehicle 105 based on the user data for the user, e.g., the user authorization. For example, the vehicle computer 110 can control vehicle 105 locks to permit the user to access areas of the vehicle 105, e.g., a driver seat, a passenger seat, a rear seat, etc., specified by the user authorization Additionally, the vehicle computer 110 can actuate one or more vehicle components 125 to operate the vehicle 105 to satisfy the operating parameters specified by the user authorization. As another example, the vehicle computer 110 can actuate one or more vehicle components 125 to adjust one or more vehicle 105 features specified by the user authorization.

Upon determining that the user is not authorized, the vehicle computer 110 can provide updated instructions to the user to provide updated secondary enrollment biometric data, e.g., as discussed above regarding providing instructions. The updated instructions may instruct the user to interact with the specified external sensors 115a to provide updated secondary enrollment biometric data. Additionally, or alternatively, the updated instructions can further instruct the user to re-initiate biometric enrollment. That is, the instructions may instruct the user to provide updated enrollment biometric data, i.e., enter the passenger cabin 200 and interact with specified internal sensors 115b, and to provide updated secondary enrollment biometric data, i.e., exit the passenger cabin 200 and interact with specified external sensors 115a.

The vehicle computer 110 is programmed to biometrically authorize the user based on the updated secondary enrollment biometric data. That is, the vehicle computer 110 can perform biometric authorization using the updated secondary enrollment biometric data and the user data. The vehicle computer 110 can determine a confidence score for the updated secondary enrollment biometric data, e.g., as discussed above regarding determining a confidence score for the secondary enrollment biometric data. The vehicle computer 110 can then compare the confidence score for the updated secondary enrollment biometric data to a second confidence threshold. The second confidence threshold is greater than the first confidence threshold, as set forth above. If the confidence score for the updated secondary enrollment biometric data exceeds the second confidence threshold, then the vehicle computer 110 can biometrically authorize the user. In this situation, the vehicle computer 110 can update the user data to include the updated secondary enrollment biometric data. If the confidence score for the updated secondary enrollment biometric data is less than or equal to the second confidence threshold, then the vehicle computer 110 can prevent actuation of one or more vehicle components 125, e.g., so as to prevent operation of the vehicle 105 and/or adjustment of one or more vehicle 105 features. In such an example, the vehicle computer 110 can instruct the HMI 118 to actuate one or more output devices to provide a message to the user specifying that biometric enrollment was unsuccessful and/or to re-initiate biometric enrollment.

Upon updating the user data, the vehicle computer 110 can control the vehicle 105 based on the updated user data for the user, e.g., the user authorization. For example, the vehicle computer 110 can actuate one or more vehicle components 125 to operate the vehicle 105 to satisfy the operating parameters specified by the user authorization. As another example, the vehicle computer 110 can actuate one or more vehicle components 125 to adjust one or more vehicle 105 features specified by the user authorization.

The vehicle computer 110 can biometrically authorize the user at a future time. The future time is a time after biometric enrollment for the user is completed. At the future time, the vehicle computer 110 can detect the user around the vehicle 105 based on data from the external sensor 115*a*. For example, the vehicle computer 110 can monitor data from the external sensor 115*a* to detect a user has moved into the field of view of the external sensor 115*a*. Upon detecting the user, the vehicle computer 110 can authenticate the user based on detecting the authenticator, as discussed above.

The vehicle computer 110 can then obtain challenge biometric data for the user, e.g., as discussed above regarding obtaining the biometric data. For example, the vehicle computer 110 can obtain the challenge biometric data for the user while the user is outside the passenger cabin 200 (see FIG. 2). The vehicle computer 110 may provide instructions, e.g., via the authorized portable device 145, for the user to provide the challenge biometric data, e.g., as discussed above. Upon obtaining the challenge biometric data, the vehicle computer 110 can then biometrically authorize the user based on the challenge biometric data and the first confidence threshold. That is, the vehicle computer 110 can determine a confidence score for the challenge biometric data, e.g., as discussed above. The vehicle computer 110 can then compare the challenge biometric data to the first confidence threshold. If the confidence score for the challenge biometric data exceeds the first confidence threshold, then the vehicle computer 110 can authorize the user. In this situation, the vehicle computer 110 can control the vehicle 105 based on the updated user data, as discussed above. For example, the vehicle computer 110 control vehicle 105 locks to permit the user to access the passenger cabin 200. If the confidence score for the challenge biometric data is less than or equal to the first confidence threshold, then the vehicle computer 110 can actuate vehicle 105 locks to prevent the user from accessing the passenger cabin 200.

Upon authorizing the user, the vehicle computer 110 can then detect the user is inside the passenger cabin 200 (see FIG. 3) based on data from the internal sensor 115*b*, e.g., as discussed above. Upon detecting the user inside the passenger cabin 200, the vehicle computer 110 is programmed to verify the user. Verifying the user refers to confirming that the user is authorized to access the vehicle 105; a failure to verify occurs upon a determination that the user is not authorized to access the vehicle 105. To verify the user, the vehicle computer 110 can biometrically authorize the user based on secondary challenge biometric data. The vehicle computer 110 can obtain the secondary challenge biometric data for the user while the user is inside the passenger cabin 200, e.g., as discussed above regarding obtaining the biometric data. The vehicle computer 110 may be programmed to provide instructions, e.g., via the HMI 118, for the user to provide the secondary challenge biometric data, as discussed above regarding providing the initial instructions.

The vehicle computer 110 can biometrically authorize the user based on the secondary challenge biometric data and the second confidence threshold, e.g., as just discussed above. In this situation, if the confidence score for the secondary challenge biometric data is less than or equal to the second confidence threshold, then the vehicle computer 110 determines to not authorize the user. In this situation, the vehicle computer 110 determines to not verify the user and can prevent operation of the vehicle 105, as discussed above. If the confidence score for the secondary challenge biometric data exceeds the second confidence threshold, the vehicle computer 110 determines to authorize the user. In this situation, the vehicle computer 110 verifies the user and can operate the vehicle 105 based on the user authorization, as discussed above.

Figure 5:
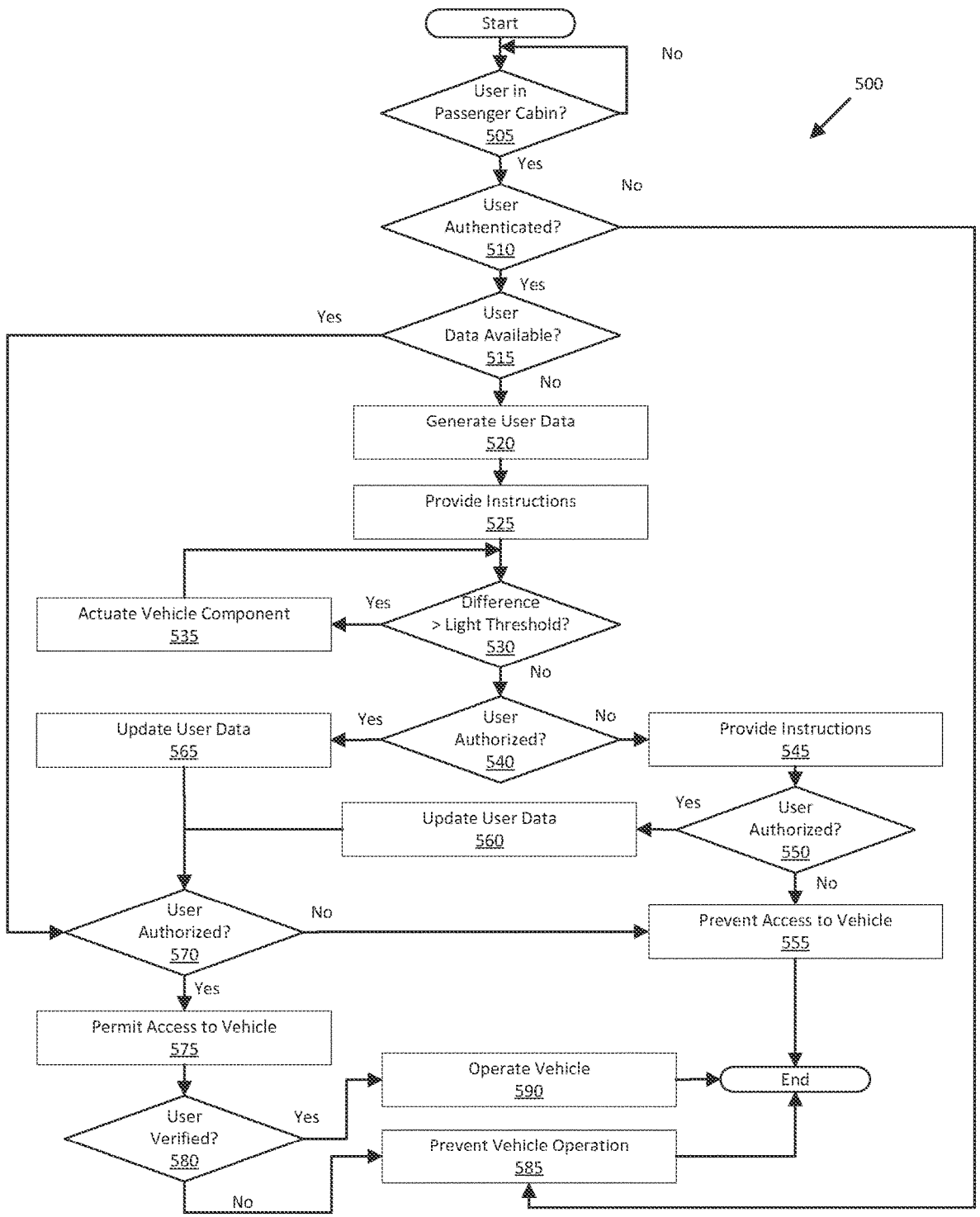
FIG. 5 is a flowchart of an example process for biometrically authorizing a user in a vehicle computer.

FIG. 5 is a diagram of an example process 500 executed in a vehicle computer 110 according to program instructions stored in a memory thereof for biometrically authorizing a user. Process 500 includes multiple blocks that can be executed in the illustrated order. Process 500 could alternatively or additionally include fewer blocks or can include the blocks executed in different orders.

Process 500 begins in a block 505. In the block 505, the vehicle computer 110 determines whether a user is in a passenger cabin 200 of the vehicle 105. The vehicle computer 110 can determine the user is in the passenger cabin 200 based on data from internal sensors 115*b*, as discussed above. If the vehicle computer 110 determines that the user is in the passenger cabin 200, then the process 500 continues in a block 510. Otherwise, the process 500 remains in the block 505.

In the block 510, the vehicle computer 110 determines whether the user is authenticated. The vehicle computer 110 can authenticate the user based on detecting a authenticator, as discussed above. If the vehicle computer 110 authenticates the user, then the process 500 continues in a block 515. Otherwise, the process 500 continues in a block 585.

In the block 515, the vehicle computer 110 determines whether user data of the user is available, e.g., stored in a memory of the vehicle computer 110, as discussed above. If user data of the user is available, then the process 500 continues in a block 570. Otherwise, the process 500 continues in a block 520.

In the block 520, the vehicle computer 110 generates user data for the user. The vehicle computer 110 can actuates one or more internal sensors 115*b* to obtain enrollment biometric data for the user, as discussed above. The vehicle computer 110 then associates the enrollment biometric data with the user, as discussed above. Additionally, the vehicle computer 110 can determine a user authorization based on detecting, via an HMI 118, a user input specifying the user authorization, as discussed above. The vehicle computer 110 can then associate the user authorization with the user. The process 500 continues in a block 525.

In the block 525, the vehicle computer 110 provides instructions to the user, as discussed above. The instructions specify actions for the user to provide secondary enrollment biometric data by exiting the passenger cabin 200 and interacting with specified external sensors 115a to provide the secondary enrollment biometric data, as discussed above. The process 500 continues in a block 530.

In the block 530, the vehicle computer 110 determines whether a difference between a light parameter at an internal sensor 115b and a light parameter at an external sensor 115a is greater than a light threshold. The vehicle computer 110 can determine the respective light parameters based on data from the respective sensors 115, as discussed above. The vehicle computer 110 can then compute the difference between the respective light parameters and compare the difference to the light threshold, as discussed above. If the difference is greater than the light threshold, then the process 500 continues in a block 535. Otherwise, the process 500 continues in a block 540.

In the block 535, the vehicle computer 110 actuates one or more vehicle components 125 to compensate for the difference between respective light parameters, as discussed above. The process 500 returns to the block 530.

In the block 540, the vehicle computer 110 determines whether to authorize the user based on the secondary enrollment biometric data. The vehicle computer 110 actuates one or more external sensors 115a to obtain the secondary enrollment biometric data for the user. The vehicle computer 110 the performs biometric authorization for the user to determine a confidence score for the secondary enrollment biometric data, as discussed above. The vehicle computer 110 compares the confidence score for the secondary enrollment biometric data to a first confidence threshold, as discussed above. If the confidence score for the secondary enrollment biometric data exceeds the first confidence threshold, then the process 500 continues in a block 565. Otherwise, the process 500 continues in a block 545.

In the block 545, the vehicle computer 110 provides updated instructions to the user, as discussed above. The updated instructions specifying actions for the user to provide updated secondary enrollment biometric data, as set forth above. The process 500 continues in a block 550.

In the block 550, the vehicle computer 110 determines whether to authorize the user based on the updated secondary enrollment biometric data. The vehicle computer 110 actuates one or more external sensors 115a to obtain the updated secondary enrollment biometric data for the user. The vehicle computer 110 then performs biometric authorization for the user to determine a confidence score for the updated secondary enrollment biometric data, as discussed above. The vehicle computer 110 compares the confidence score for the updated secondary enrollment biometric data to a second confidence threshold, as discussed above. The second confidence threshold is greater than the first confidence threshold, as set forth above. If the confidence score for the updated secondary enrollment biometric data exceeds the second confidence threshold, then the process 500 continues in a block 560. Otherwise, the process 500 continues in a block 555.

In the block 555, the vehicle computer 110 prevents the user from accessing the vehicle 105. For example, the vehicle computer 110 can actuate vehicle locks and/or windows to prevent the user from entering the passenger cabin 200. The process 500 ends following the block 555.

In the block 560, the vehicle computer 110 updates the user data to include the updated secondary enrollment biometric data, as discussed above. The process 500 continues in a block 570.

In the block 565, the vehicle computer 110 updates the user data to include the secondary enrollment biometric data, as discussed above. The process 500 continues in a block 570.

In the block 570, the vehicle computer 110 determines whether to authorize the user based on challenge biometric data. The vehicle computer 110 can actuate one or more external sensors 115a to obtain challenge biometric data for the user, as discussed above. The block 565 is substantially identical to the block 535 of the process 500 therefore will not be described further to avoid redundancy. If a confidence score for the challenge biometric data exceeds the first confidence threshold, then the process 500 continues in a block 575. Otherwise, the process 500 continues in the block 555.

In the block 575, the vehicle computer 110 permits the user to access the vehicle 105. For example, the vehicle computer 110 can actuate vehicle locks to permit the user to enter the passenger cabin 200. The process 500 continues in a block 580.

In the block 580, the vehicle computer 110 determines whether to verify the user based on secondary challenge biometric data. The vehicle computer 110 can actuate one or more internal sensors 115b to obtain secondary challenge biometric data for the user, as discussed above. The block 580 is substantially identical to the block 550 of the process 500 therefore will not be described further to avoid redundancy. If the confidence score for the secondary challenge biometric data exceeds the second confidence threshold, then the process 500 continues in a block 590. Otherwise, the process 500 continues in a block 585.

In the block 585, the vehicle computer 110 prevents vehicle operation. That is, the vehicle computer prevents the user from controlling the vehicle 105, as discussed above. The process 500 ends following the block 585.

In the block 590, the vehicle computer 110 controls one or more vehicle components 125 based on the user data for the user, as discussed above. The process 500 ends following the block 590.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
   after receiving biometric data for a user, determine that user data for the user is unavailable, instruct the user to exit a structure, and generate user data for the user;
   obtain secondary enrollment biometric data for the user of the structure while the user is outside of the structure;
   based on determining that a confidence score for the secondary enrollment biometric data does not exceed a first confidence threshold, provide instructions to the user to provide updated secondary enrollment biometric data;
   then, after receiving the updated secondary enrollment biometric data, generate updated user data based on a confidence score for the updated secondary enrollment biometric data exceeding a second confidence threshold, wherein the second confidence threshold is greater than the first confidence threshold;
   authorize the user based on a confidence score for challenge biometric data exceeding the first confidence threshold;
   allow the user to re-enter the structure based on authorizing the user and then verify the user inside the structure based upon a confidence score for secondary challenge biometric data obtained outside of the structure exceeding the second confidence threshold; and
   control structure components based on verifying the user.

2. The system of claim 1, wherein the instructions further include instructions to generate the user data based on obtaining enrollment biometric data for the user inside the structure before obtaining the secondary enrollment biometric data while the user is outside of the structure.

3. The system of claim 2, wherein the instructions further include instructions to, upon detecting the user inside the structure, provide instructions, via the structure components, to the user to provide the enrollment biometric data.

4. The system of claim 1, wherein the instructions further include instructions to, prior to obtaining the secondary enrollment biometric data, actuate the structure components based on determining a difference between a light parameter at an exterior sensor and a light parameter at an interior sensor, wherein the interior sensor is positioned inside the structure and the exterior sensor is positioned outside of the structure.

5. The system of claim 4, wherein the structure component is at least one of a lighting component or a window.

6. The system of claim 1, wherein the instructions further include instructions to, upon determining to not authorize the user, prevent the user from accessing the structure.

7. The system of claim 1, wherein the instructions further include instructions to obtain the challenge biometric data based on one of receiving a user input or detecting an authorized portable device within a predetermined distance of the structure.

8. The system of claim 1, wherein the instructions to control structure components include instructions to permit the user to operate controls for the structure.

9. The system of claim 1, wherein the instructions further include instructions to, upon determining not to verify the user, prevent the user from operating controls for the structure.

10. The system of claim 1, wherein the instructions further include instructions to update the user data based on receiving a user input.

11. The system of claim 1, wherein the instructions further include instructions to update the user data based additionally on detecting an authorized portable device within a predetermined distance of the structure.

12. A method, comprising:
after receiving biometric data for a user, determining that user data for the user is unavailable, instructing the user to exit a structure, and generating user data for the user;
obtaining secondary enrollment biometric data for the user of the structure while the user is outside of the structure;
based on determining that a confidence score for the secondary enrollment biometric data does not exceed a first confidence threshold, providing instructions to the user to provide updated secondary enrollment biometric data;
then, after receiving the updated secondary enrollment biometric data, generating updated user data based on a confidence score for the updated secondary enrollment biometric data exceeding a second confidence threshold, wherein the second confidence threshold is greater than the first confidence threshold;
authorizing the user based on a confidence score for challenge biometric data exceeding the first confidence threshold;
allowing the user to re-enter the structure based on authorizing the user and then verifying the user inside the structure based upon a confidence score for secondary challenge biometric data obtained outside of the structure exceeding the second confidence threshold; and
controlling structure components based on verifying the user.

13. The method of claim 12, further comprising, prior to obtaining the secondary enrollment biometric data, actuating the structure components based on determining a difference between light parameter at an exterior sensor and light parameter at an interior sensor, wherein the interior sensor is positioned inside the structure and the exterior sensor is positioned outside of the structure.

14. The method of claim 12, wherein generating the user data is based on obtaining enrollment biometric data for the user inside the structure before obtaining the secondary enrollment biometric data while the user is outside of the structure.

15. The method of claim 12, further comprising, prior to obtaining the secondary enrollment biometric data, actuating the structure components based on determining a difference between a light parameter at an exterior sensor and a light parameter at an interior sensor, wherein the interior sensor is positioned inside the structure and the exterior sensor is positioned outside of the structure.

16. The method of claim 12, further comprising obtaining the challenge biometric data based on one of receiving a user input or detecting an authorized portable device within a predetermined distance of the structure.

17. The method of claim 12, wherein controlling structure components includes permitting the user to operate controls for the structure.

18. The method of claim 12, further comprising updating the user data based on receiving a user input.

19. The method of claim 12, further comprising updating the user data based on detecting an authorized portable device within a predetermined distance of the structure.

* * * * *